United States Patent
Nagano et al.

(10) Patent No.: US 7,346,372 B2
(45) Date of Patent: Mar. 18, 2008

(54) RADIO COMMUNICATION SYSTEM

(75) Inventors: Yuuji Nagano, Yokohama (JP);
Kiyohide Yamashita, Yokohama (JP);
Yuji Nomura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 520 days.

(21) Appl. No.: 11/053,652

(22) Filed: Feb. 8, 2005

(65) Prior Publication Data

US 2006/0089166 A1 Apr. 27, 2006

(30) Foreign Application Priority Data

Oct. 27, 2004 (JP) .............................. 2004-311651

(51) Int. Cl.
*H04B 1/38* (2006.01)
(52) U.S. Cl. .................... 455/561; 455/435.2; 370/338
(58) Field of Classification Search ................ 455/418, 455/435.1, 2, 436, 440, 450, 507, 517, 550.1, 455/561; 370/328, 338
See application file for complete search history.

(56) References Cited

U.S. PATENT DOCUMENTS

| 7,006,827 | B2 * | 2/2006 | Masuda et al. | ............. | 455/439 |
| 7,120,136 | B2 * | 10/2006 | Upp et al. | .................. | 370/331 |
| 7,155,234 | B2 * | 12/2006 | Kitazawa et al. | ........ | 455/452.2 |
| 2003/0003895 | A1 * | 1/2003 | Wallentin et al. | ........... | 455/410 |
| 2005/0122944 | A1 * | 6/2005 | Kwon et al. | ................ | 370/338 |
| 2005/0185623 | A1 * | 8/2005 | Ray et al. | .................... | 370/338 |

FOREIGN PATENT DOCUMENTS

| JP | 07-075153 | 3/1995 |
| JP | 09-163443 | 6/1997 |
| JP | 2002-051368 | 2/2002 |

\* cited by examiner

*Primary Examiner*—Edward F. Urban
*Assistant Examiner*—Nhan T. Le
(74) *Attorney, Agent, or Firm*—Katten Muchin Rosenman LLP

(57) ABSTRACT

A radio communication system for leveling off the processing loads of radio stations (access points) to which mobile terminals are connected, to improve the quality of service in radio communication. A mobile terminal searches for a beacon signal and transmits a connection request to a radio station which has sent the beacon signal captured. In the access point, a beacon-signal transmission section transmits the beacon signal, a connection-count management section manages, according to a connection-completion message, a local-station connection count and an other-station connection count, and a connection processing section receives the connection request, performs comparison processing for the local-station connection count and the other-station connection count, applies, when the local-station connection count is smaller than the other-station connection count, connection processing to the mobile terminal and generates a connection-completion message when a connection to the mobile terminal is completed.

13 Claims, 14 Drawing Sheets

T1 COMPARISON TABLE

| CONNECTION-COUNT DIFFERENCE | THRESHOLD |
|---|---|
| −3 OR LESS | 4 |
| −2 | 3 |
| −1 | 2 |
| 0 | 1 |
| 1 | 0 |
| 2 | 0 |
| 3 OR MORE | 0 |

FIG. 3

T2 COMPARISON TABLE

| TOTAL NUMBER OF CONNECTIONS | CONNECTION-COUNT DIFFERENCE | THRESHOLD |
|---|---|---|
| 4 OR LESS | −3 OR LESS | 4 |
| | −2 | 3 |
| | −1 | 2 |
| | 0 | 1 |
| | 1 | 0 |
| | 2 | 0 |
| | 3 OR MORE | 0 |
| 5 TO 10 | −3 OR LESS | 3 |
| | −2 | 2 |
| | −1 | 1 |
| | 0 | 1 |
| | 1 | 0 |
| | 2 | 0 |
| | 3 OR MORE | 0 |
| 11 TO 20 | −3 OR LESS | 2 |
| | −2 | 2 |
| | −1 | 1 |
| | 0 | 1 |
| | 1 | 0 |
| | 2 | 0 |
| | 3 OR MORE | 0 |

FIG. 5

T3 MONITORING-PERIOD TABLE

| TOTAL NUMBER OF CONNECTIONS | MONITORING PERIOD (s) |
|---|---|
| 0 | 20 |
| 1 | 22 |
| 2 | 24 |
| 3 | 26 |
| 4 | 28 |
| 5 | 30 |
| 6 | 32 |
| 7 | 34 |
| 8 | 36 |
| 9 | 38 |
| 10 | 40 |
| 11 | 42 |
| 12 | 44 |
| 13 | 46 |
| 14 | 48 |
| 15 | 50 |
| 16 | 52 |
| 17 | 54 |
| 18 | 56 |
| 19 | 58 |
| 20 OR MORE | 60 |

FIG. 10

RADIO COMMUNICATION SYSTEM

CROSS-REFERENCE TO RELATED APPLICATIONS

This application is based upon and claims the benefits of priority from the prior Japanese Patent Application No. 2004-311651, filed on Oct. 27, 2004, the entire contents of which are incorporated herein by reference.

BACKGROUND OF THE INVENTION

1. Field of the Invention

The present invention relates to radio communication systems, and particularly to a radio communication system for controlling radio-signal communications in a radio local area network (LAN).

2. Description of the Related Art

Radio LANs, which use electromagnetic waves for communications, have been widely spread in recent years, and the market thereof has been expanding. Since radio LANs do not use cables, cable-placing time and labor are unnecessary, and terminals can be installed at any places and moved. The needs for radio LANs have been increasing not only in companies but also in homes, and further market growth is expected.

Radio LANs are standardized in the Institute of Electrical and Electronics Engineers (IEEE) 802.11. It includes three extended specifications, IEEE 802.11a, IEEE 802.11b, and IEEE 802.11g.

In IEEE 802.11a, communications are performed at a rate of up to 54 Mbps, and the 5-GHz frequency band is used. Currently, IEEE 802.11b is used most frequently, has a maximum rate of 11 Mbps, and uses the 2.4-GHz frequency band.

IEEE 802.11g uses the same 2.4-GHz frequency band as IEEE 802.11b, but can provide about-five-times higher-speed communications at a rate of about 54 Mbps. In addition, unlike IEEE 802.11a, IEEE 802.11g is compatible with IEEE 802.11b. Antennas and radio-related sections can be designed in the same way as in IEEE 802.11b. With these reasons, IEEE 802.11g attracts attention as a future main standard, and products conforming thereto have been developed.

In radio LANs, an access point and a mobile terminal are connected by radio for communications. An "access point" in radio LANs means a relay unit (radio station) connected to the LANs.

An access point sends a beacon signal to indicate the existence thereof, and a mobile terminal searches for a beacon signal. In a radio-LAN connection conforming to IEEE 802.11g, a beacon signal needs to have a specified frequency in each of channels (CHs) 1 to 13, and each access point sends a beacon signal belonging to one specified channel to the air.

A mobile terminal sequentially searches channels 1 to 13 for a beacon signal. When it receives a beacon signal having the frequency of a certain channel, it locks at the channel, stops the searching (scanning) operation, and connects to the corresponding access point.

FIG. 11 shows a connection operation in a radio LAN. An access point 101 sends a CH1 beacon signal. A mobile terminal 114 moves its position and enters the radio area of the access point 101 while it searches channels 1 to 13 for a beacon signal.

When the mobile terminal 114 receives (captures) the CH1 beacon signal to detect the access point 101, it stops the scanning operation, and connects by radio to the access point 101, which is the transmission source of the CH1 beacon signal. Assuming that the access point 101 has already been connected by radio to mobile terminals 111 to 113, it now is connected to a total of four mobile terminals 111 to 114.

A conventional technology for radio-LAN connections has been disclosed in which a mobile terminal selects an access point to be connected (for example, in paragraphs [0025] and [0026] and FIG. 1 of Japanese Unexamined Patent Application Publication No. 2002-51368).

When a plurality of access points which send beacon signals in different channels (frequencies) are installed, there may be a radio area where beacon signals of different channels exit depending on the installation condition. In that case, if mobile terminals are located at the radio area, many mobile terminals may connect to the same access point, increasing the processing load of the access point.

FIG. 12 to FIG. 14 show this drawback. In FIG. 12, there are two access points 101 and 102. The access point 101 sends a CH1 beacon signal, and the access point 102 sends a CH2 beacon signal. In the CH1 radio area B1 of the access point 101 and the CH2 radio area B2 of the access point 102, there is a radio area B3 where the radio area B1 and the radio area B2 overlap.

It is assumed that mobile terminals 111 to 114 have already connected to the access point 101 by the channel 1, and mobile terminal 115 and 116 have already connected to the access point 102 by the channel 2. Mobile terminals 117 and 118 located in the radio area B3, the overlapping area, can connect to either of the access points 101 and 102.

When the mobile terminals 117 and 118 connect to the access point 102, as shown in FIG. 13, the access points 101 and 102 have an equal processing load. When the access points 101 and 102 send data to the mobile terminals 111 to 118 at 2 Mbps, for example, the access points 101 and 102 send 8-Mbps data in an equal manner.

When the mobile terminals 117 and 118 connect to the access point 101, as shown in FIG. 14, the access point 101 has a higher processing load. When the access points 101 and 102 send data to the mobile terminals 111 to 118 at 2 Mbps, for example, the access points 101 sends 12-Mbps data and the access point 102 sends 4-Mbps data.

In this way, depending on the connections of mobile terminals, it is conventionally possible that one access point has a high processing load while the other access point has a low processing load, which causes an inefficient operation.

In the above-described conventional technology (Japanese Unexamined Patent Application Publication No. 2002-51368), control is made such that a mobile terminal detects the traffic volumes of data communication at access points to select an access point having a low traffic volume, so as to make the processing loads of access points almost uniform. Since mobile terminals have an access-point selection function in such control, it is necessary to add the function to all mobile terminals (notebook computers, or the like) commercially sold, which is not necessarily an optimum solution.

SUMMARY OF THE INVENTION

In view of the foregoing, the present invention has been made. It is an object of the present invention to provide a radio communication system which makes the processing loads of access points connected to mobile terminals almost uniform to improve the quality of service in radio communication.

The above object is achieved in one aspect of the present invention through the provision of a radio communication system which performs radio-signal communication control. This radio communication system includes a mobile terminal for searching for a beacon signal and for transmitting a connection request to a radio station which has sent the beacon signal captured, and the radio station. The radio station includes a beacon-signal transmission section for transmitting the beacon signal indicating the existence of the local station, a connection-count management section for managing, according to a connection-completion message, a local-station connection count indicating the number of mobile terminals currently connected to the local station and an other-station connection count indicating the number of mobile terminals currently connected to the other station, a connection processing section for receiving the connection request, for performing comparison processing for the local-station connection count and the other-station connection count, for applying, when the local-station connection count is smaller than the other-station connection count, connection processing to the mobile terminal and for generating a connection-completion message when a connection to the mobile terminal is completed, and for rejecting connection processing for the mobile terminal when the local-station connection count is larger than the other-station connection count, and an inter-station communication section for transmitting the connection-completion message generated by the local station to the other station and for receiving a connection-completion message from the other station.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows a comparison table.

FIG. 5 shows a comparison table.

FIG. 10 shows a monitoring-period table.

DESCRIPTION OF THE PREFERRED EMBODIMENTS

Figure 1:
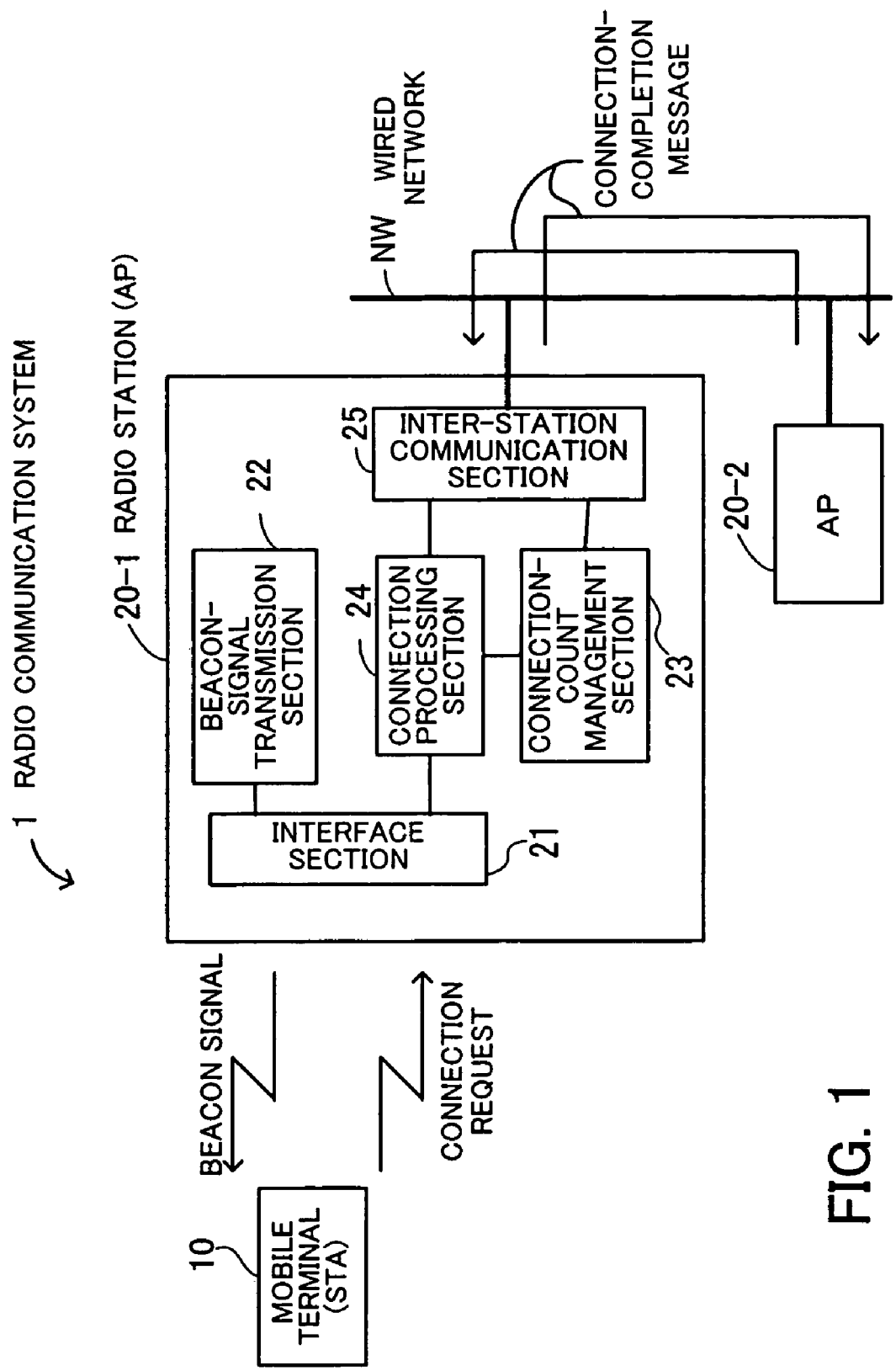
FIG. 1 shows an outline of a radio communication system according to an embodiment of the present invention.

Embodiments of the present invention will be described below by referring to the drawings. FIG. 1 shows an outline of a radio communication system 1 according to an embodiment of the present invention. The radio communication system 1 includes a mobile terminal 10, and radio stations 20-1 and 20-2, and controls radio-signal communication.

The radio stations 20-1 and 20-2 are connected to each other through a wired network NW, and the mobile terminal 10 is connected by radio to the radio station 20-1 or the radio station 20-2. Actually, the radio stations 20-1 and 20-2 have the same function. Hereinafter, a mobile terminal is called an STA, and a radio station is called an access point or an AP.

The STA 10 sequentially searches the channel 1 to the channel 13 for a beacon signal. When it captures a beacon signal in a certain channel (frequency), it locks at the channel and stops the searching (scanning) operation, and sends a connection request to the AP which has sent the captured beacon signal at the frequency.

The AP 20-1 is formed of an interface section 21, a beacon-signal transmission section 22, a connection-count management section 23, a connection processing section 24, and an inter-station communication section 25. The interface section 21 performs radio-LAN interface control between the STA 10 and the AP 20-1. The beacon-signal transmission section 22 transmits a beacon signal which indicates the existence of the local station (transmits a beacon signal in one channel determined for the local station from the channel 1 to the channel 13). The beacon signal is radiated to the air through the interface section 21.

The connection-count management section 23 manages a local-station connection count indicating the number of mobile terminals currently connecting to the local station, and an other-station connection count indicating the number of mobile terminals currently connecting to the other station, according to connection-completion messages.

When a connection to the STA 10 is completed, the connection processing section 24 generates a connection-completion message. When the connection-count management section 23 receives a connection-completion message generated by the local station (AP 20-1), it increments the local-station connection count and stores the count. When the connection-count management section 23 receives a connection-completion message generated by the other station (AP20-2), it increments the other-station connection count and stores the count.

When the connection to the STA 10 is disconnected, the connection processing section 24 generates a disconnection message. When the connection-count management section 23 receives a disconnection message generated by the local station (AP20-1), it decrements the local-station connection count and stores the count. When the connection-count management section 23 receives a disconnection message generated by the other station (AP20-2), it decrements the other-station connection count and stores the count.

The connection processing section 24 receives a connection request from the STA 10 through the interface section 21, and compares the local-station connection count and the other-station connection count. When the local-station connection count is smaller than the other-station connection count, the connection processing section 24 applies connection processing to the STA 10, and generates a connection-completion message when the connection to the STA 10 is completed. When the local-station connection count is larger than the other-station connection count, the connection processing section 24 rejects the connection request. When the connection processing section 24 detects a disconnection from the STA 10, it generates a disconnection message.

The inter-station communication section 25 has a function for performing communications between the APs 20-1 and 20-2 through the wired network NW. For example, the inter-station communication section 25 sends a connection-completion message generated by the local station (AP 20-1) to the other station (AP 20-2), and receives a connection-completion message sent from the AP 20-2 (a disconnection message is also exchanged in the same way as a connection-completion message).

Figure 2:
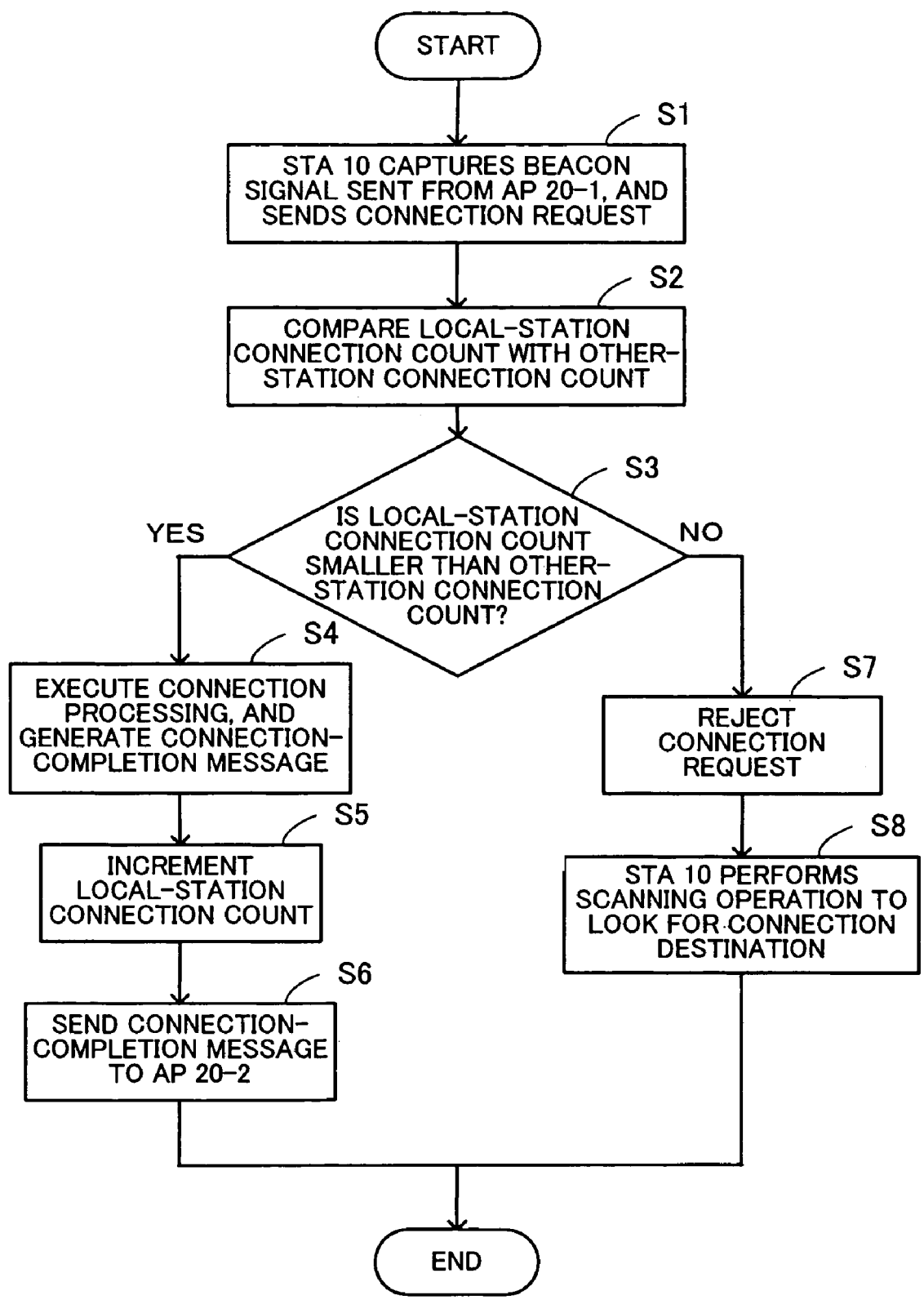
FIG. 2 is a flowchart of the operation of the entire radio communication system.

The operation of the radio communication system 1 will be described next. FIG. 2 is a flowchart of the operation of the entire radio communication system 1.

Step S1: The STA 10 captures a beacon signal sent from the AP 20-1, and sends a connection request to the AP 20-1.

Step S2: The connection processing section 24 receives the connection request through the interface section 21. After receiving it, the connection processing section 24 reads the number (local-station connection count) of STAs currently connected to the AP 20-1 and the number (other-station connection count) of STAs currently connected to the AP 20-2 from the connection-count management section 23, and compares them.

The connection-count management section 23 receives a connection-completion message from the AP 20-2 through the wired network NW and the inter-station communication section 25, and stores the number of STAs currently connected to the AP 20-2 as the other-station connection count.

Step S3: When the local-station connection count for the AP 20-1 is smaller than the other-station connection count for the AP 20-2, the processing proceeds to step S4. When the local-station connection count for the AP 20-1 is larger than the other-station connection count for the AP 20-2, the processing proceeds to step S7.

Step S4: The connection processing section 24 applies connection processing to the STA 10. The connection processing section 24 generates a connection-completion message when the connection has been made, and sends the connection-completion message to the connection-count management section 23 and the inter-station communication section 25.

Step S5: The connection-count management section 23 receives the connection-completion message, increments the current connection count of the AP 20-1, and stores it (updates the connection count in the AP 20-1).

Step S6: The inter-station communication section 25 sends the connection-completion message to the AP 20-2 through the wired network NW. When the AP 20-2 receives the connection-completion message, the connection-count management section of the AP 20-2 increments the current connection count of the AP 20-1, and stores it (updates the connection count in the AP 20-2).

Step S7: The connection processing section 24 rejects the connection request sent from the STA 10, and sends a connection-rejection notice to the STA 10.

Step S8: When the STA 10 receives the connection-rejection notice from the AP 20-1, the STA 10 starts the scanning operation to search for a new connection destination, and moves. When the STA 10 enters the radio area of the AP 20-2, the AP 20-2 performs the same connection control as the AP 20-1.

The comparison processing performed by the connection processing section 24 will be described next. The connection processing section 24 of the AP 20-1 has a comparison table which includes connection-count differences (=the local-station connection counts−the other-station connection counts) indicating the differences between the local-station connection counts and the other-station connection counts, and corresponding thresholds. The connection processing section 24 compares the connection-count difference and the threshold to determine whether the STA is to be connected. The thresholds are dynamically set by the AP 20-1 to values indicating the numbers of STAs which can be additionally connected, according to the connection-count differences.

FIG. 3 shows an example comparison table T1. The comparison table T1 is formed of a field of connection-count differences and a field of thresholds. The connection processing section 24 calculates connection-count differences and dynamically specifies thresholds for the calculated values to generate this comparison table T1.

In FIG. 3, a connection-count difference of −3 or less means that the AP 20-2, which is the other station, is connected to a greater number of STAs than the AP 20-1, which is the local station, by three or more.

When the connection-count difference is −3 or less in FIG. 3, the threshold is 4. Since −3 is smaller than 4, the connection-count difference is smaller than the threshold. When the connection-count difference is smaller than the threshold, STA connection processing is performed.

In this case, a threshold of 4 is specified for a connection-count difference of −3 or less. This means that four more STAs can be connected to the AP 20-1 when the connection-count difference is −3 or less (when three more STAs are connected to the AP 20-1, the same number of STAs are connected to both of the AP 20-1 and the AP 20-2. Since it is assumed that one extra STA can be connected, the threshold has been set to 4).

When the connection-count difference is zero, it means that the AP 20-1 and the AP 20-2 are connected to the same number of STAs. Since the threshold is set to one, and 0 (connection-count difference)<1 (threshold), the connection-count difference is smaller than the threshold, and STA connection processing is performed. Since the threshold is 1 when the connection-count difference is 0, it is understood that one more STA can be connected to the AP 20-1.

When the connection-count difference is 2, it means that, since the local-station connection count−the other-station connection count=2, the AP 20-1 is connected to a greater number of STAs than the AP 20-2 by two.

When the connection-count difference is 2, since the threshold is set to 0, and 2 (connection-count difference)>0 (threshold), the connection-count difference is greater than the threshold, and STA connection processing is not performed. Since the threshold is 0, it is also understood that no more STA can be connected to the AP 20-1.

The thresholds described above are not only used in the comparison but also indicate the numbers of STAs which can be additionally connected to the local station. Therefore, when the network administrator wants to know how many STAs can be additionally connected to an AP, for example, the administrator can immediately understand the answer by seeing the threshold specified autonomously in the AP.

Figure 4:
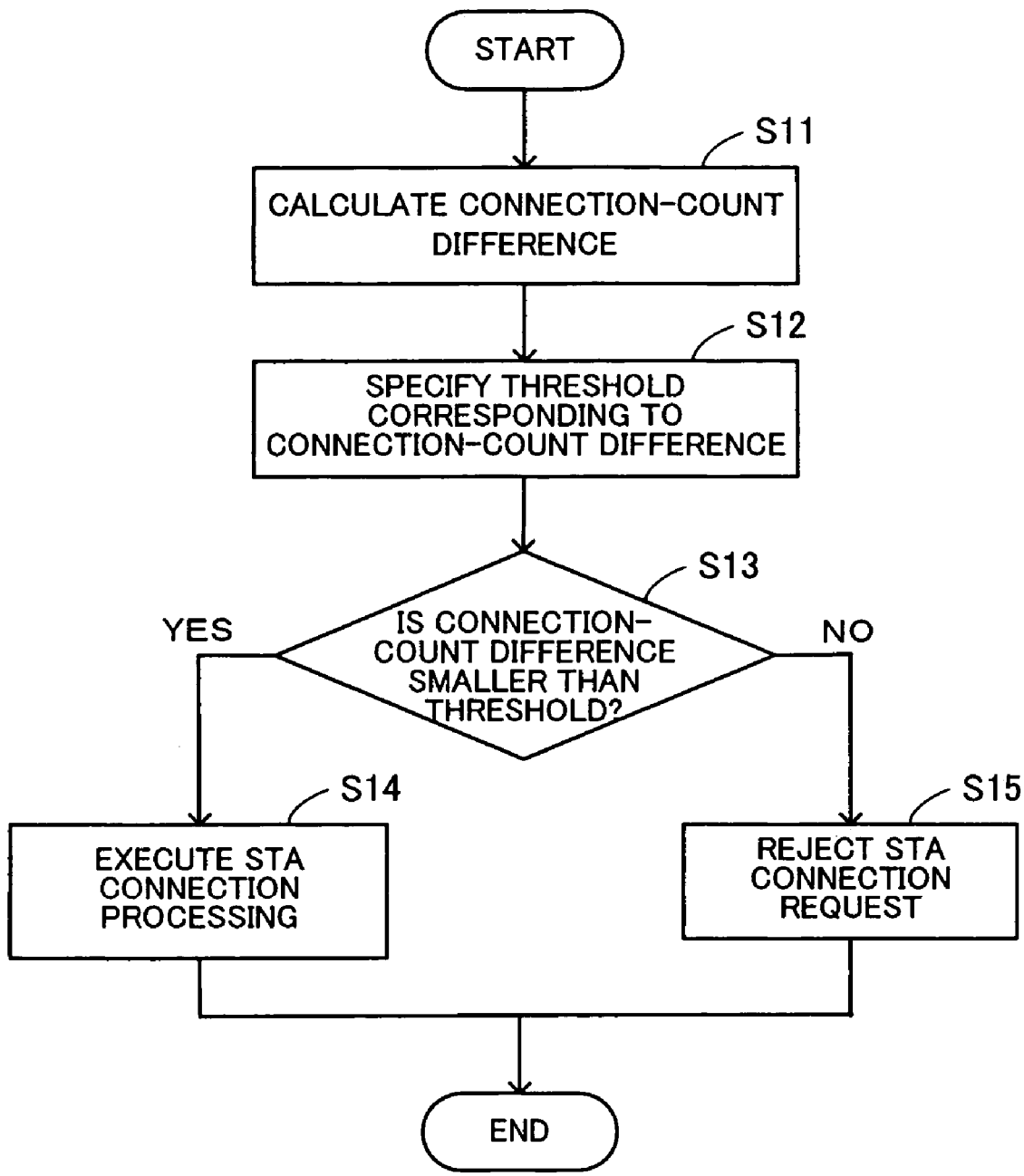
FIG. 4 is a flowchart of a connection-processing operation performed by a connection processing section.

FIG. 4 is a flowchart of the connection processing performed by the connection processing section 24.

Step S11: The connection processing section 24 reads the local-station connection count and the other-station connection count from the connection-count management section 23, and obtains the connection-count difference (=local-station connection count−other-station connection count).

Step S12: The connection processing section 24 dynamically specifies thresholds corresponding to connection-count differences, and creates the comparison table T1.

Step S13: The connection processing section 24 compares the actual connection-count difference with the threshold. When the connection-count difference is smaller than the threshold, the processing proceeds to step S14. When the connection-count difference is greater than the threshold, the processing proceeds to step S15.

Step S14: The connection processing section 24 performs the STA connection processing. When the connection is made, the connection processing section 24 generates a connection-completion message.

Step S15: The connection processing section 24 rejects a connection to the STA.

With the above-described connection processing or similar processing, the AP 20-1 and the AP 20-2 are each connected to almost the same number of STAs, which means that the processing load of the AP 20-1 and the processing load of the AP 20-2 are made almost equal.

Modified comparison processing performed by the connection processing section 24 will be described next. In the comparison processing above-described by referring to FIG. 3 and FIG. 4, whether a new STA is to be connected or not is determined only by the connection-count difference between the AP 20-1 and the AP 20-2. In the present modified comparison processing, the number of STAs currently connected is also taken into account.

When many STAs which make the processing load of the AP 20-1 close to the limit have already been connected to the AP 20-1, even if the connection-count difference between the AP 20-1 and the AP 20-2 is smaller than the threshold, no more STAs 10 should be connected to the AP 20-1.

Therefore, in the modified comparison processing, to implement the above-described issue, whether to connect to the STA 10 is determined according to the connection-count difference and the number of STAs currently connected to the AP 20-1.

FIG. 5 shows a comparison table T2. The comparison table T2 lists the total numbers of STAs currently connected to the AP 20-1, connection-count differences, and thresholds. The comparison table T2 is generated by the connection processing section 24 by dynamically specifying a threshold for the connection-count difference calculated by the connection processing section 24 for each of the total numbers of STAs connected.

In the comparison table T2, the total numbers of STAs currently connected are divided into three classes, four STAs or less, five to ten STAs, and eleven to twenty STAs. In each class, a threshold is specified for each connection-count difference.

When the total number of STAs connected is four or less, if the connection-count difference is −3 or less (the number of STAs currently connected to the AP 20-2, the other station, is greater by three or more than the number of STAs currently connected to the AP 20-1, the local station), the threshold is four, which means that four more STAs can be connected to the AP 20-1.

When the total number of STAs connected is five to ten, if the connection-count difference is −3 or less, the threshold is three, which means that three more STAs can be connected to the AP 20-1. In other words, when the total number of STAs connected is five to ten, since the AP 20-1 has a heavier processing load than when the total number of STAs connected is four or less, the threshold is set smaller, so that only a smaller number of STAs can be connected than when the total number of STAs connected is four or less.

When the total number of STAs connected is eleven to twenty, if the connection-count difference is −3 or less, the threshold is two, which means that two more STAs can be connected to the AP 20-1. In other words, when the total number of STAs connected is eleven to twenty, since the AP 20-1 has a further heavier processing load than when the total number of STAs connected is five to ten, the threshold is set smaller, so that only a smaller number of STAs can be connected than when the total number of STAs connected is five to ten.

In connection processing which uses the comparison table T2, a combination of a connection-count difference and the threshold is selected according to the total number of STAs currently connected, and the same processing as that described above by referring to FIG. 3 is performed.

Figure 6:
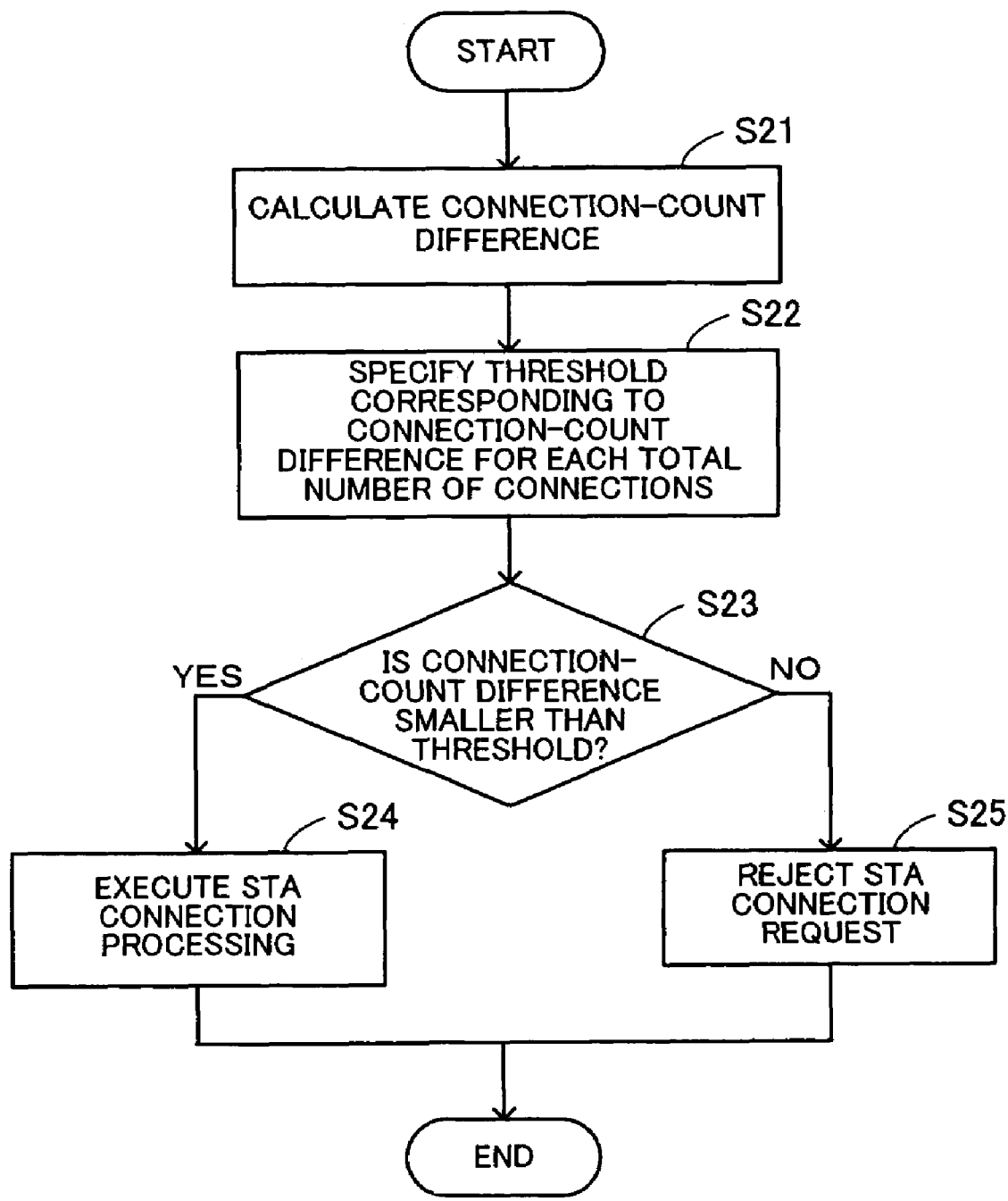
FIG. 6 is a flowchart of another connection-processing operation performed by the connection processing section.

FIG. 6 is a flowchart of the connection processing which uses the comparison table T2, performed by the connection processing section 24.

Step S21: The connection processing section 24 reads the local-station connection count and the other-station connection count from the connection-count management section 23, and obtains the connection-count difference (=local-station connection count−other-station connection count).

Step S22: The connection processing section 24 dynamically specifies thresholds corresponding to connection-count differences for each of the total numbers of STAs connected, and creates the comparison table T2.

Step S23: The connection processing section 24 compares the actual connection-count difference with the threshold for the number of STAs currently connected. When the connection-count difference is smaller than the threshold, the processing proceeds to step S24. When the connection-count difference is greater than the threshold, the processing proceeds to step S25.

Step S24: The connection processing section 24 performs the STA connection processing. When the connection is made, the connection processing section 24 generates a connection-completion message.

Step S25: The connection processing section 24 rejects a connection to the STA.

With the above-described connection processing or similar processing which is performed with the total number of STAs currently connected being taken into account, STAs are connected to the AP 20-1 so that the processing load of the AP 20-1 falls in a suitable range.

Figure 7:
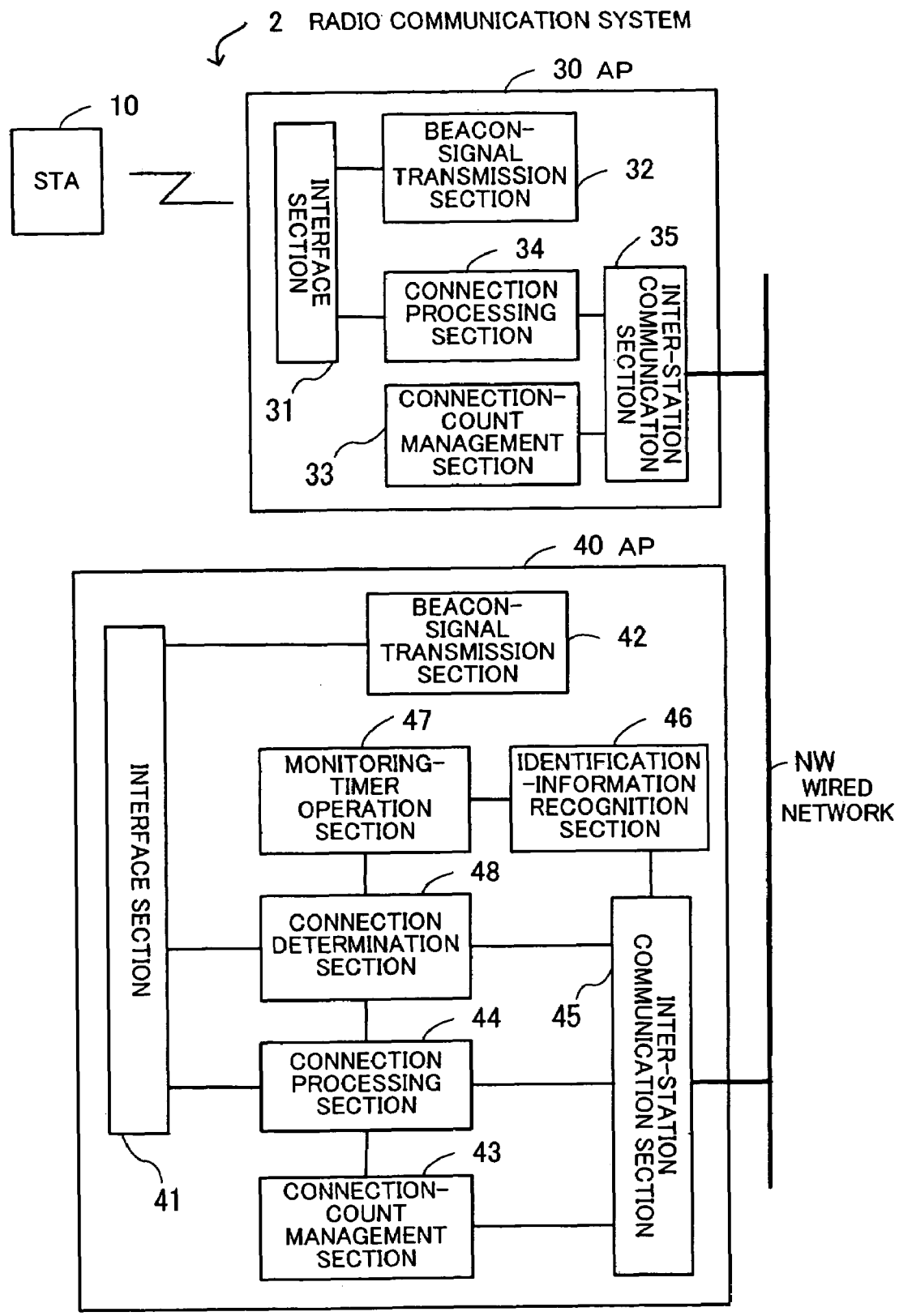
FIG. 7 shows the configuration of another radio communication system according to an embodiment of the present invention.

A radio communication system which determines whether to connect to an STA 10 by recognizing the identification information of the STA 10 will be described next. FIG. 7 shows the structure of such a radio communication system 2. The radio communication system 2 includes an STA 10, a first radio station (AP 30), and a second radio station (AP 40), and performs radio-signal communication control.

The AP 30 and the AP 40 are connected to each other through a wired network NW. The STA 10 is connected by radio to the AP 30 or the AP 40. In the figure, although the AP 30 and the AP 40 have different internal sections, they actually have the same functions.

The AP 30 is formed of an interface section 31, a beacon-signal transmission section 32 (corresponding to a first beacon-signal transmission section), a connection-count management section 33, a connection processing section 34 (corresponding to a first connection processing section), and an inter-station communication section 35 (corresponding to a first inter-station connection section). Since the interface section 31, the beacon-signal transmission section 32, and the connection-count management section 33 performs the same operations as the interface section 21, the beacon-signal transmission section 22, and the connection-count management section 23 described above by referring to FIG. 1, respectively, a description thereof is omitted.

When the connection processing section 34 receives a new connection request from the STA 10, the connection processing section 34 obtains the identification information of the STA 10 from the new connection request. As the identification information, the media access control (MAC) address of the STA 10 is used. When the connection processing section 34 obtains the MAC address from the new connection request of the STA 10, it once rejects the connection request of the STA 10.

The connection processing section 34 rejects a connection to the STA 10, also when it receives a connection rejection message from the AP 40. When the connection processing section 34 receives a connection-permission message from the AP 40 and again receives a connection request from the STA 10, the connection processing section 34 performs connection processing with the STA 10, and generates a connection-completion message when the connection has been completed (when the connection processing section 34 detects a disconnection from the STA 10, it generates a disconnection message).

The inter-station communication section 35 communicates with the AP 40 through the wired network NW, and sends the MAC address recognized by the connection processing section 34 to the AP 40. The inter-station communication section 35 also receives a connection-permission message or a connection-rejection message (a disconnection message is also exchanged in the same way as the connection-completion message).

The AP 40 is formed of an interface section 41, a beacon-signal transmission section 42 (corresponding to a second beacon-signal transmission section), a connection-count management section 43, a connection processing section 44 (corresponding to a second connection processing section), an inter-station communication section 45 (corresponding to a second inter-station connection section), an identification-information recognition section 46, a monitoring-timer operation section 47, and a connection determination section 48. Since the interface section 41, the beacon-signal transmission section 42, and the connection-count management section 43 performs the same operations as the interface section 21, the beacon-signal transmission section 22, and the connection-count management section 23 described above by referring to FIG. 1, respectively, a description thereof is omitted.

The identification-information recognition section 46 receives and recognizes the MAC address of the STA 10, sent from the AP 30. The monitoring-timer operation section 47 operates a monitoring timer to determine whether to receive or not a connection request from the STA 10, which includes the recognized MAC address, within a monitoring period.

When the connection determination section 48 receives a connection request which includes the MAC address recognized by the identification-information recognition section 46, within the monitoring period through the interface section 41, the connection determination section 48 determines that the STA 10 is located at a radio area where the radio areas of the AP 30 and the AP 40 overlap. Then, the connection determination section 48 generates a connection resection message with respect to the STA 10, which is to be sent to the AP 30, and also generates a connection-processing instruction for the STA 10 so as to connect the STA 10 to the AP 40.

When the connection determination section 48 does not receive a connection request which includes the MAC address recognized by the identification-information recognition section 46, within the monitoring period through the interface section 41, the connection determination section 48 determines that the STA 10 is not located in the overlapping radio area, but in the radio area of the AP 30. Then, the connection determination section 48 generates a connection-permission message with respect to the STA 10, which is to be sent to the AP 30, and rejects a connection to the STA 10 for the AP 40.

The connection processing section 44 first recognizes the connection-processing instruction generated by the connection determination section 48, applies comparison processing to the local-station connection count for the AP 40 and the other-station connection count for the AP 30, and then, performs connection processing. Since the comparison processing and the connection processing are the same as the comparison processing and the connection processing (described by referring to FIG. 3 to FIG. 6), respectively, executed by the connection processing section 24 of the radio communication system 1, a description thereof is omitted.

The inter-station communication section 45 communicates with the AP 30 through the wired network NW, and sends the connection-permission message or the connection rejection message to the AP 30. The inter-station communication section 45 also sends a connection-completion message generated by the AP 40 to the AP 30, and receives a connection-completion message and the MAC address from the AP 30 (a disconnection message is also exchanged in the same way as the connection-completion message).

Figure 8:
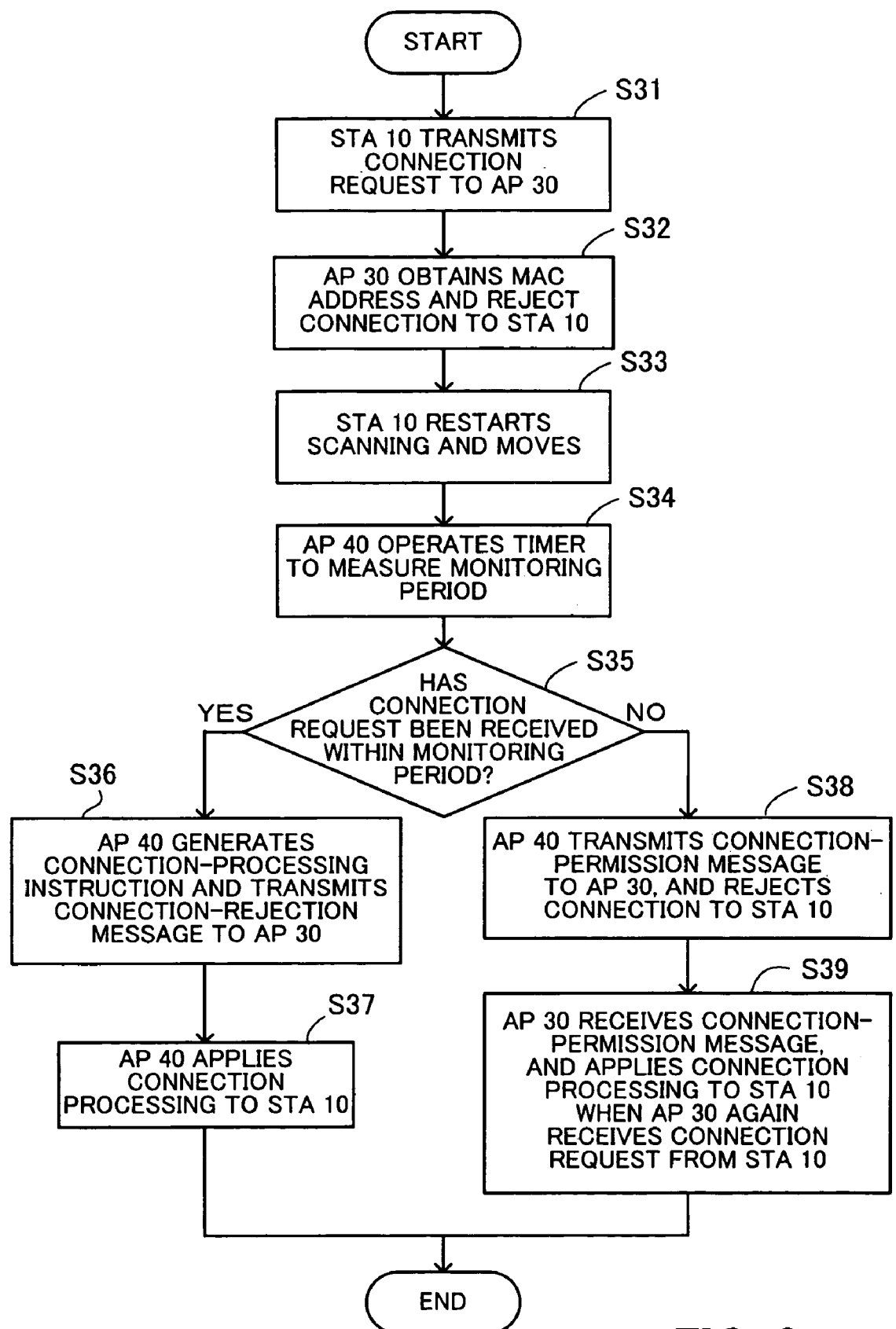
FIG. 8 is a flowchart of the operation of the entire radio communication system.
Figure 9:
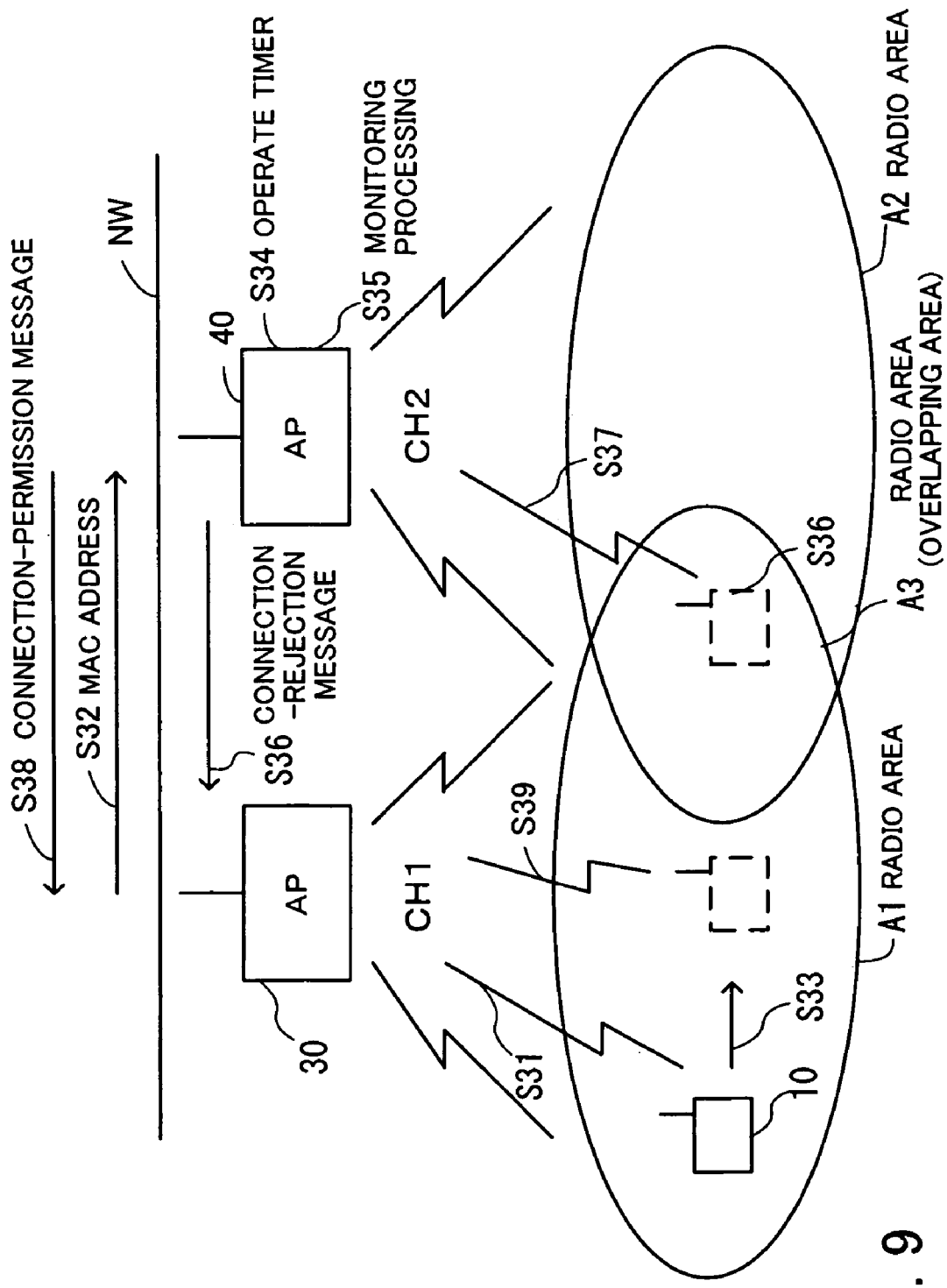
FIG. 9 shows movement states of an STA.
Figure 11:
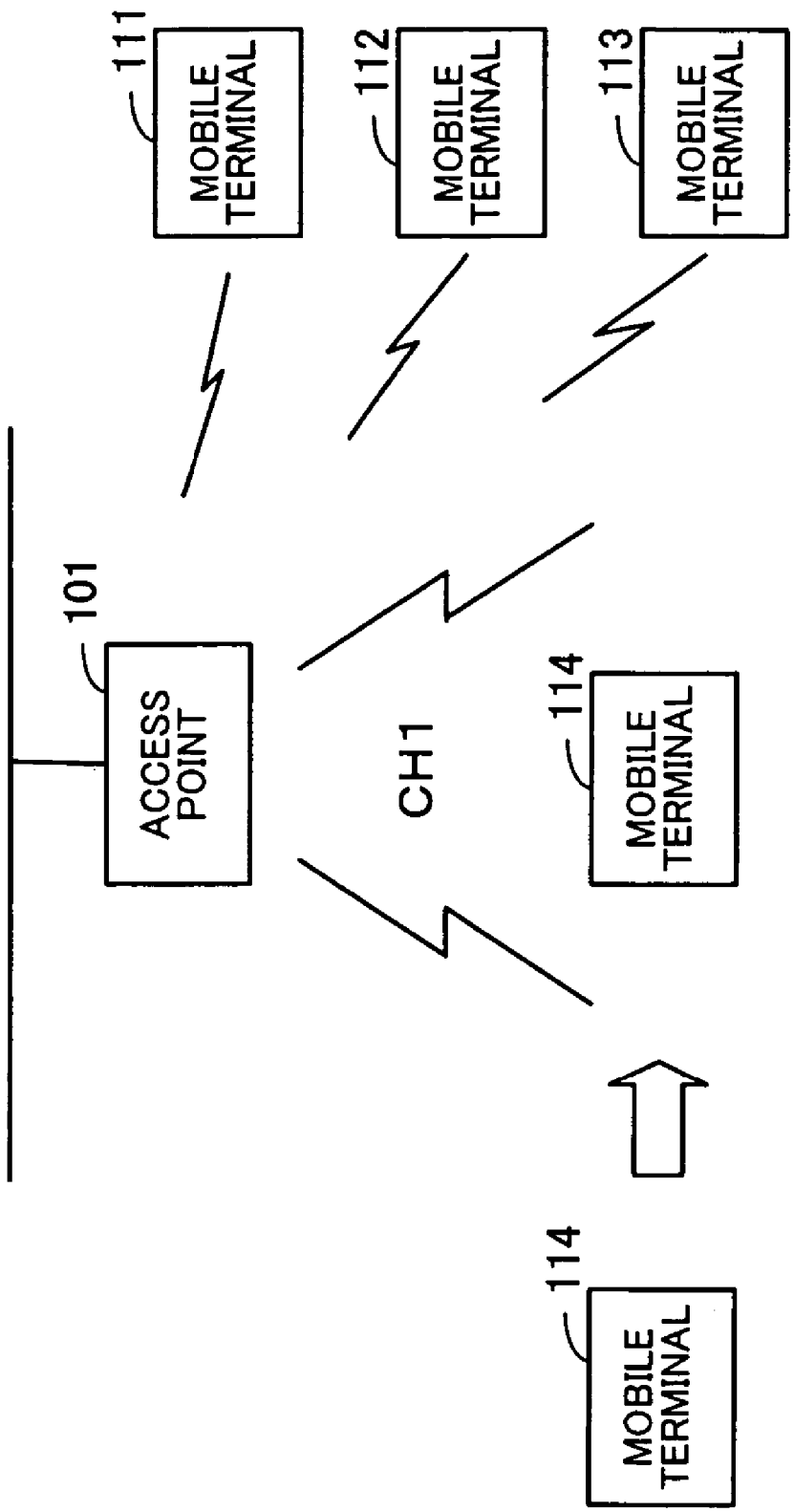
FIG. 11 shows a connection operation in a radio LAN.
Figure 12:
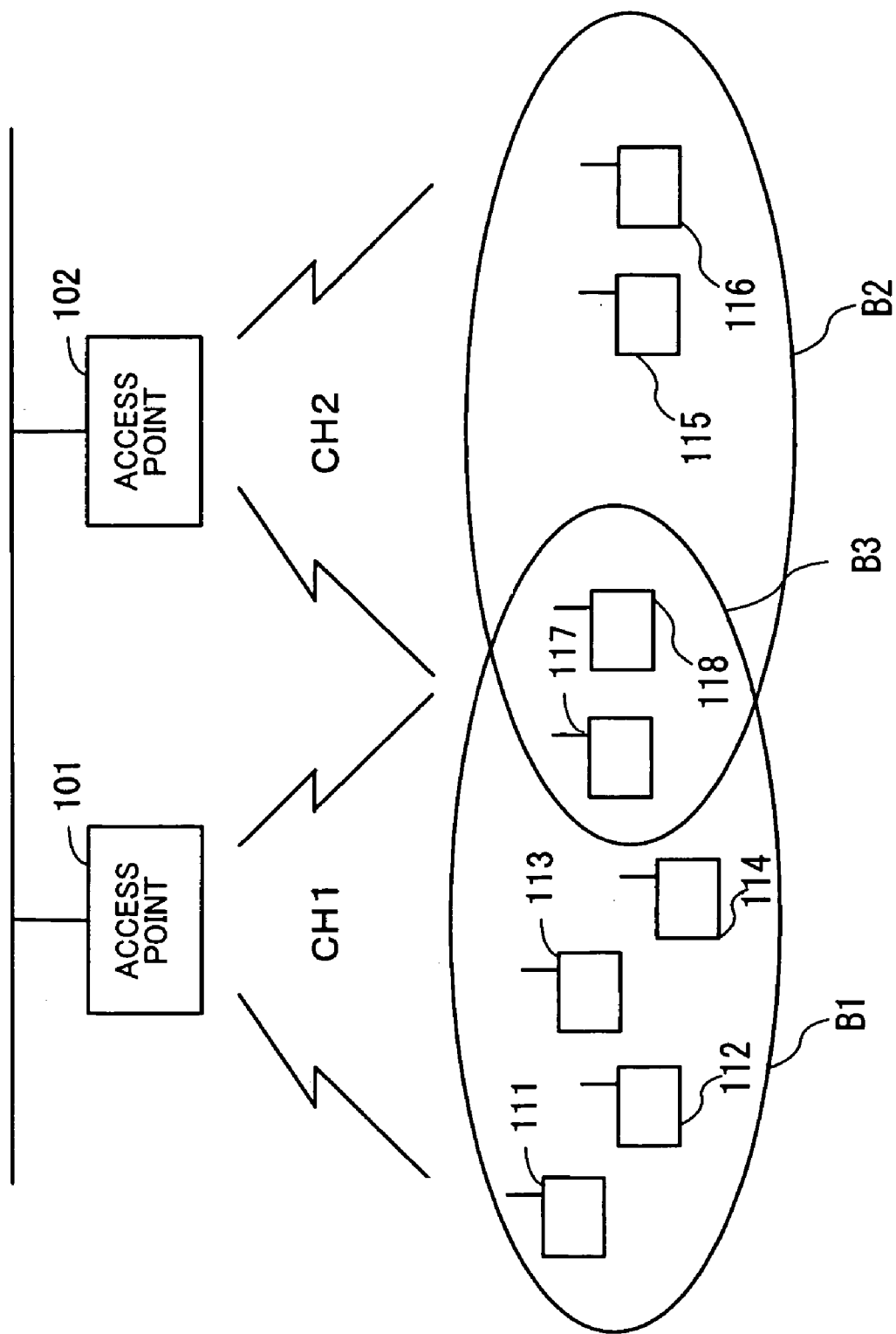
FIG. 12 to FIG. 14 are used to show a drawback in a conventional technology.
Figure 13:
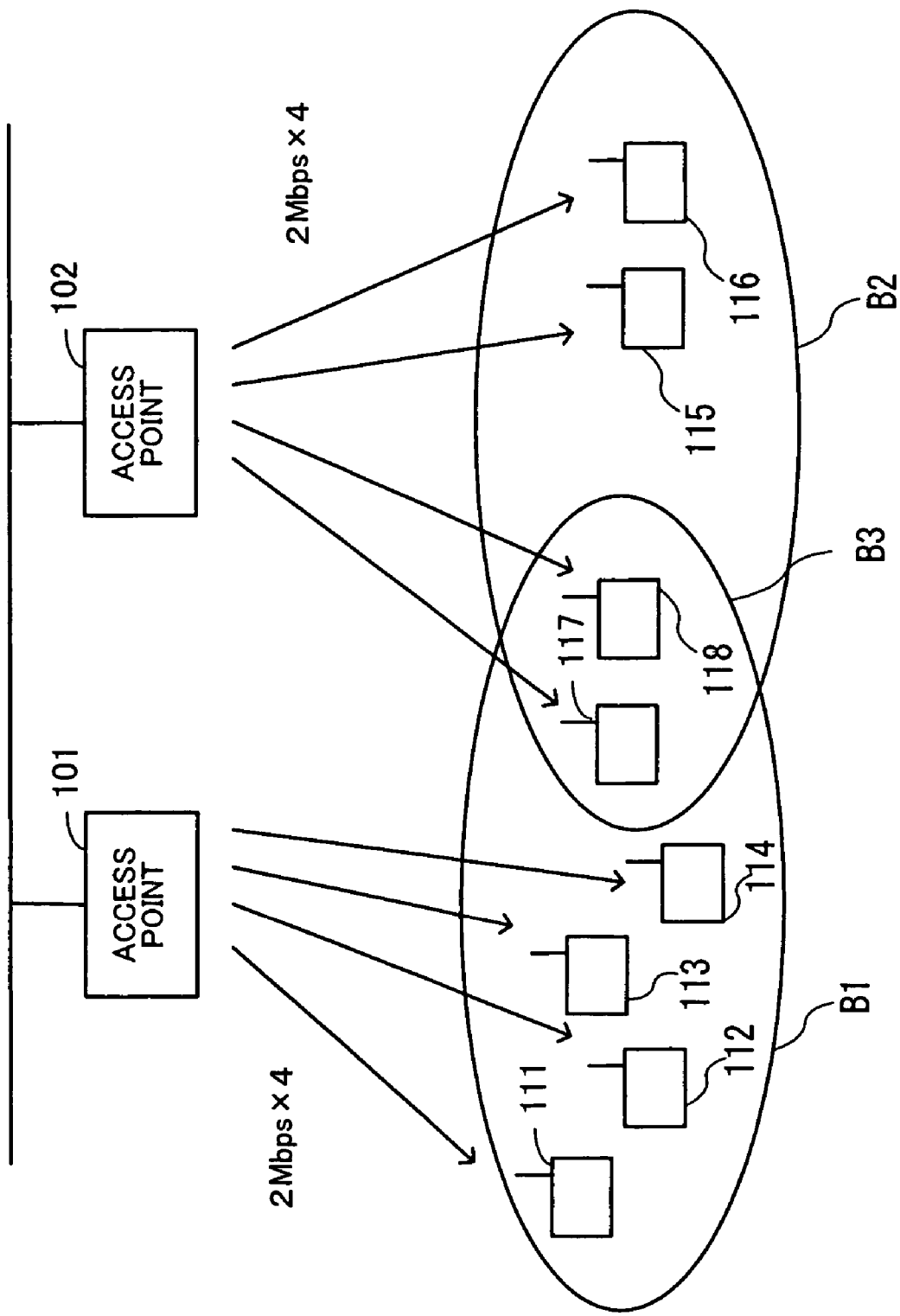
Figure 14:
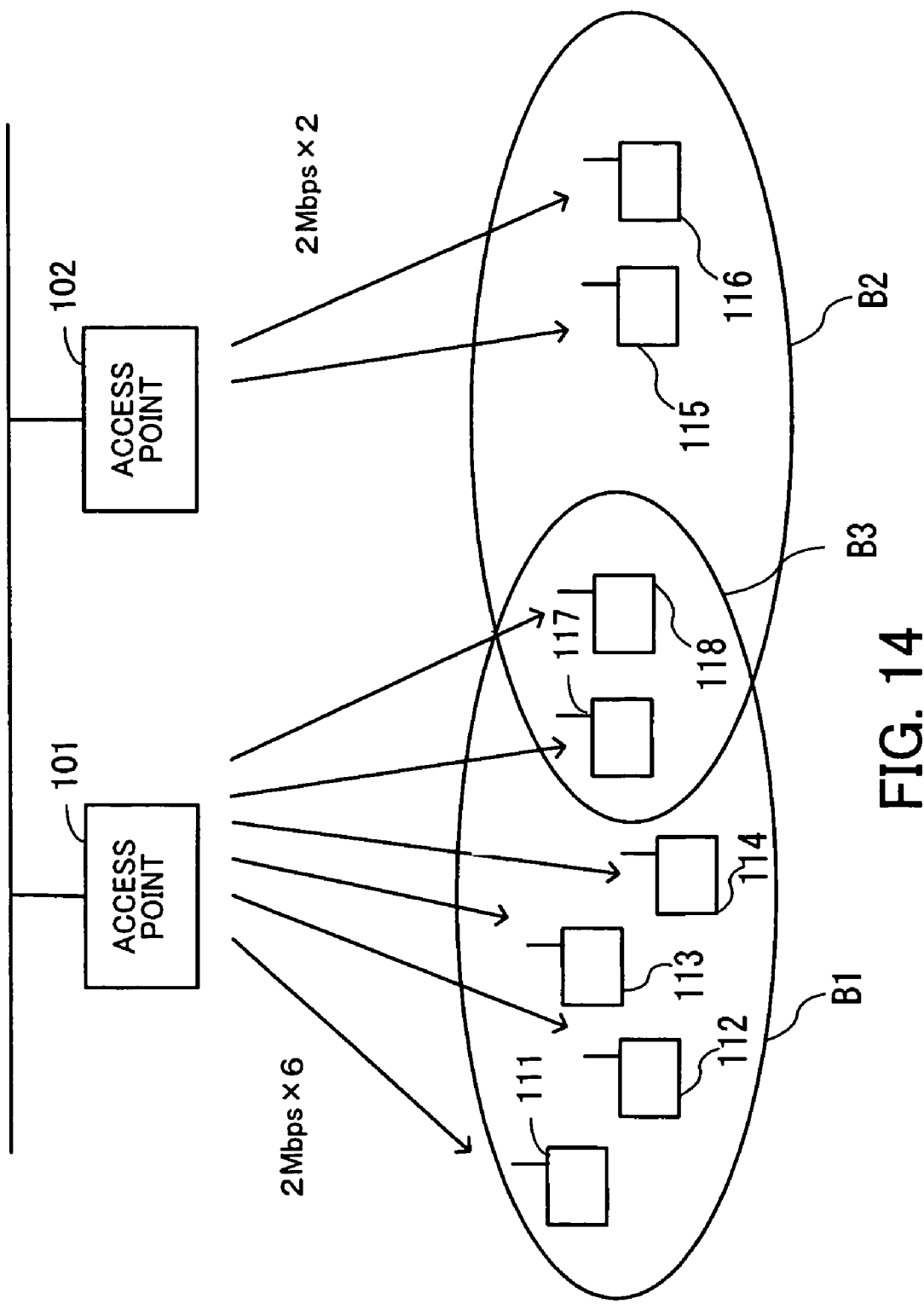

The operation of the radio communication system 2 will be described next by referring to FIG. 8 and FIG. 9. FIG. 8 is a flowchart of the operation of the entire radio communication system 2. FIG. 9 shows movement states of the STA 10. Step numbers in the operation flow shown in FIG. 8 are indicated at the corresponding portions in FIG. 9.

In FIG. 9, the AP 30 and the AP 40 are connected to each other through the wired network NW. A range where a CH1 signal transmitted from the AP 30 can be received is called a radio area A1, a range where a CH2 signal transmitted from the AP 40 can be received is called a radio area A2, and a range where the radio areas A1 and A2 overlap is called a radio area A3.

Step S31: When the STA 10 captures a CH1 beacon signal sent from the AP 30 during a scanning operation, it sends a connection request to the AP 30.

Step S32: When the connection processing section 34 of the AP 30 receives the connection request from the STA 10, the connection processing section 34 obtains the MAC address of the STA 10, included in the connection request, and send the MAC address to the AP 40. The AP 30 once rejects the connection request sent from the STA 10.

Step S33: Since the connection request to the AP 30 was rejected, the STA 10 restarts the scanning operation and moves.

Step S34: When the identification-information recognition section 46 of the AP 40 recognizes the MAC address sent from the AP 30, the monitoring-timer operation section 47 operates the monitoring timer for counting a monitoring period.

Step S35: The connection determination section 48 of the AP 40 determines whether to receive a connection request which includes the MAC address recognized, within the monitoring period. When the connection request is received within the monitor period, the processing proceeds to step S36. When the connection request is not received within the monitoring period, the processing proceeds to step S38.

Step S36: When the connection request has been received within the monitor period, the connection determination section 48 determines that the STA 10 is located in the radio area A3. In other words, when the connection request which includes the MAC address recognized has been received within the monitoring period, it may be deemed that, after the connection request to the AP 30 was rejected, the STA 10 moved while looking for a new connection destination, and has reached the radio area A3, where the CH2 beacon signal sent from the AP 40 can be received.

Therefore, in this case, the connection determination section 48 generates a connection-processing instruction for connecting the STA 10 to the AP 40. The connection determination section 48 also generates a connection-rejection message so that the AP 30 does not connect to the STA 10, and the inter-station communication section 45 sends the connection-rejection message to the AP 30.

Step S37: When the connection processing section 44 of the AP 40 receives the connection-processing instruction generated by the connection determination section 48, it performs the connection processing described above by referring to FIG. 3 to FIG. 6. When the connection is completed, the connection processing section 44 generates a connection-completion message. (The connection-completion message is sent to the connection-count management section 43 to increment the local-station (AP 40) connection count. The connection-completion message is also sent to the AP 30.)

When the connection processing section 34 of the AP 30 receives the connection-rejection message from the AP 40, the connection-processing section 34 of the AP 30 rejects a connection to the STA 10 (even when a connection request is received from the STA 10 because the AP 40 performs connection processing.)

Step S38: When the connection request is not received within the monitor period, the connection determination section 48 determines that the STA 10 is not located in the radio area A3. In other words, when the connection request which includes the MAC address recognized is not received within the monitoring period, it may be deemed that, after the connection request to the AP 30 was once rejected, the STA 10 moved while looking for a new connection destination, but has not yet reached the radio area A3, where the CH2 beacon signal sent from the AP 40 can be received.

Therefore, in this case, the connection determination section 48 generates a connection-permission message with respect to the STA 10 for the AP 30 so that the STA 10 will be connected to the AP 30, and the inter-station communication section 45 sends the connection-permission message to the AP 30. The AP 40 rejects a connection to the STA 10.

Step S39: When the AP 30 receives the connection-permission message from the AP 40, and again receives a connection request from the STA 10, the AP 30 performs connection processing with the STA 10, and generates a connection-completion message when the connection is completed. (The connection-completion message is sent to the connection-count management section 33 to increment the local-station (AP-30) connection count. The connection-completion message is also sent to the AP 40.)

FIG. 10 shows a monitoring-period table T3. The monitoring-timer operation section 47 has the monitoring-period table T3. The monitoring-period table T3 lists the total numbers of connections, which indicate the numbers of STAs currently connected to the AP 40, and corresponding monitoring periods.

As shown from the table, the larger the total number of connections is, the longer the monitoring period is set. This is because, when the number of STAs currently connected to the AP 40 increases, since the processing load of the AP 40 also increases, connection processing for an STA to be connected need more time to start. Therefore, as the total number of connections increases, the monitoring period is made longer. A monitoring period is set according to the total number of connections. Under this condition, the monitoring-timer operation section 47 activates the timer.

As described above, in the radio communication system 1, many radio LAN connections are not directed only to one AP, the processing load of each AP is leveled off, and a heavy processing load of an AP is reduced.

In the radio communication system 2, whether an STA is located at a range where radio areas overlap is determined. With this, the connection processing described above by referring to FIG. 3 to FIG. 6 is applied only to an STA located at a range where radio LAN areas overlap. Therefore, the processing load of each AP is leveled off more accurately.

In a radio communication system according to the present invention, a mobile terminal searches for a beacon signal, and sends a connection request to the radio station which sent a beacon signal the moving terminal captured. The radio station manages a local-station connection count which indicates the number of mobile terminals currently connected to the local station, and an other-station connection count which indicates the number of mobile terminals currently connected to the other station, compares the local-station connection count with the other-station connection count after a connection request is received, and performs connection processing for the mobile terminal. Therefore, the processing load of a radio station to which the mobile terminal is to be connected is leveled off, and the quality of service in radio communication is improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio communication system for performing radio-signal communication control, comprising:
    a mobile terminal for searching for a beacon signal and for transmitting a connection request to a radio station which has sent the beacon signal captured; and
    the radio station comprising:
        a beacon-signal transmission section for transmitting the beacon signal indicating the existence of the local station;
        a connection-count management section for managing, according to a connection-completion message, a local-station connection count indicating the number of mobile terminals currently connected to the local station and an other-station connection count indicating the number of mobile terminals currently connected to the other station;
        a connection processing section for receiving the connection request, for performing comparison processing for the local-station connection count and the other-station connection count, for applying, when the local-station connection count is smaller than the other-station connection count, connection processing to the mobile terminal and for generating a connection-completion message when a connection to the mobile terminal is completed, and for rejecting connection processing for the mobile terminal when the local-station connection count is larger than the other-station connection count; and
        an inter-station communication section for transmitting the connection-completion message generated by the local station to the other station and for receiving a connection-completion message from the other station.

2. The radio communication system according to claim 1, wherein the connection processing section comprises a comparison table which comprises a connection-count difference between the local-station connection count and the other-station connection count, and a threshold;
the threshold is dynamically set to the number of mobile terminals which can be additionally connected to the local station, according to the connection-count difference; and
the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to level off the processing loads of the local station and the other station.

3. The radio communication system according to claim 1, wherein the connection processing section comprises a comparison table which comprises a total connection count of mobile terminals currently connected to the local station, a connection-count difference between the local-station connection count and the other-station connection count, and a threshold;
the threshold is dynamically set to the number of mobile terminals which can be additionally connected to the local station, according to the connection-count difference for each total connection count; and
the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to make the processing load of the local station fall in a suitable range.

4. A radio station for performing radio-signal communication control, comprising:
a beacon-signal transmission section for transmitting a beacon signal indicating the existence of the local station;
a connection-count management section for managing, according to a connection-completion message, a local-station connection count indicating the number of mobile terminals currently connected to the local station and an other-station connection count indicating the number of mobile terminals currently connected to the other station;
a connection processing section for receiving a connection request sent from a mobile terminal, for performing comparison processing for the local-station connection count and the other-station connection count, for applying, when the local-station connection count is smaller than the other-station connection count, connection processing to the mobile terminal and for generating a connection-completion message when a connection to the mobile terminal is completed, and for rejecting connection processing for the mobile terminal when the local-station connection count is larger than the other-station connection count; and
an inter-station communication section for transmitting the connection-completion message generated by the local station to the other station and for receiving a connection-completion message from the other station.

5. The radio station according to claim 4, wherein the connection processing section comprises a comparison table which comprises a connection-count difference between the local-station connection count and the other-station connection count, and a threshold;
the threshold is dynamically set to the number of mobile terminals which can be additionally connected to the local station, according to the connection-count difference; and
the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to level off the processing loads of the local station and the other station.

6. The radio station according to claim 4, wherein the connection processing section comprises a comparison table which comprises a total connection count of mobile terminals currently connected to the local station, a connection-count difference between the local-station connection count and the other-station connection count, and a threshold;
the threshold is dynamically set to the number of mobile terminals which can be additionally connected to the local station, according to the connection-count difference for each total connection count; and
the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to make the processing load of the local station fall in a suitable range.

7. A radio LAN connection method for connecting a mobile terminal and a radio station by radio in a radio LAN,
wherein the mobile terminal searches for a beacon signal and transmits a connection request to the station which has transmitted the beacon signal captured, and
the radio station
transmits the beacon signal indicating the existence of the local station;
manages, according to a connection-completion message, a local-station connection count indicating the number of mobile terminals currently connected to the local station and an other-station connection count indicating the number of mobile terminals currently connected to the other station;
receives the connection request, performs comparison processing for the local-station connection count and the other-station connection count, applies, when the local-station connection count is smaller than the other-station connection count, connection processing to the mobile terminal and generates a connection-completion message when a connection to the mobile terminal is completed,
rejects connection processing for the mobile terminal when the local-station connection count is larger than the other-station connection count; and transmits the connection-completion message generated by the local station to the other station and receives a connection-completion message from the other station.

8. The radio LAN connection method according to claim 7, wherein a comparison table which comprises a connection-count difference between the local-station connection count and the other-station connection count, and a threshold is provided;
the threshold is dynamically set to the number of mobile terminals which can be additionally connected to the local station, according to the connection-count difference; and
the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to level off the processing loads of the local station and the other station.

9. The radio LAN connection method according to claim 7, wherein a comparison table which comprises a total connection count of mobile terminals currently connected to the local station, a connection-count difference between the local-station connection count and the other-station connection count, and a threshold is provided;
the threshold is dynamically set to the number of mobile terminals which can be additionally connected to the local station, according to the connection-count difference for each total connection count; and
the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to make the processing load of the local station fall in a suitable range.

10. A radio communication system for performing radio-signal communication control, comprising:
a mobile terminal for searching for a beacon signal and for transmitting a connection request to a radio station which has sent the beacon signal captured;
a first radio station comprising:
a first beacon-signal transmission section for transmitting a beacon signal indicating the existence of the local station;
a first connection processing section for, when a new connection request is received from the mobile terminal, obtaining identification information of the mobile terminal from the new connection request, and for rejecting a connection to the mobile terminal, for, when a connection-rejection message is received from the other station, rejecting a connection to the mobile terminal,
for, when a connection-permission message is received from the other station and a connection request is again received from the mobile terminal, performing connection processing for the mobile terminal, and for generating a connection-completion message when the connection is completed; and
a first inter-station communication section for transmitting the identification information to the other station, and for receiving the connection-permission message and the connection-rejection message from the other station; and
a second radio station comprising:
a second beacon-signal transmission section for transmitting a beacon signal indicating the existence of the local station;
an identification-information recognition section for recognizing the identification information transmitted from the first radio station;
a monitoring-timer operation section for operating a monitoring timer to determine whether to receive a connection request which includes the recognized identification information from the mobile terminal within a monitoring period;
a connection determination section for, when a connection request which includes the identification information is received within the monitoring period, determining that the mobile terminal is located in an overlapping radio area where the radio area of the local station and the radio area of the other station overlap, for generating the connection-rejection message with respect to the mobile terminal, to be transmitted to the first radio station, and for generating a connection-processing instruction for the mobile terminal; and for, when a connection request which includes the identification information is not received within the monitoring period, determining that the mobile terminal is not located in the overlapping radio area but in the radio area of the first radio station, for generating the connection-permission message with respect to the mobile terminal for the first radio station, and for rejecting a connection to the mobile terminal;
a connection-count management section for managing, according to a connection-completion message, a local-station connection count indicating the number of mobile terminals currently connected to the local station and an other-station connection count indicating the number of mobile terminals currently connected to the other station;
a second connection processing section for, after the connection-processing instruction is recognized, performing comparison processing for the local-station connection count and the other-station connection count, for applying, when the local-station connection count is smaller than the other-station connection count, connection processing to the mobile terminal and for generating a connection-completion message when a connection to the mobile terminal is completed, and for rejecting connection processing for the mobile terminal when the local-station connection count is larger than the other-station connection count; and
a second inter-station communication section for receiving the identification information from the first radio station, for transmitting the connection-permission message and the connection-rejection message to the first radio station, for transmitting the connection-completion message generated by the local station to the first radio station, and for receiving a connection-completion message from the first radio station.

11. The radio communication system according to claim 10, wherein the second connection processing section comprises a comparison table which comprises a connection-count difference between the local-station connection count and the other-station connection count, and a threshold;

the threshold is dynamically set to the number of mobile terminals which can be additionally connected to the local station, according to the connection-count difference; and the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to level off the processing loads of the local station and the other station.

12. The radio communication system according to claim 10, wherein the second connection processing section comprises a comparison table which comprises a total connection count of mobile terminals currently connected to the local station, a connection-count difference between the local-station connection count and the other-station connection count, and a threshold;

the threshold is dynamically set to the number of mobile terminals which can be additionally connected to the local station, according to the connection-count difference for each total connection count; and the connection processing is applied to the mobile terminal such that, when the connection-count difference is smaller than the threshold in the comparison processing, a connection is made to the mobile terminal, and when the connection-count difference is larger than the threshold in the comparison processing, a connection to the mobile terminal is rejected, so as to make the processing load of the local station fall in a suitable range.

13. The radio communication system according to claim 10, wherein the monitoring-timer operation section dynamically increases or decreases the monitoring period according to the number of mobile terminals currently connected.

* * * * *